United States Patent
Wang

[11] Patent Number: 6,086,438
[45] Date of Patent: Jul. 11, 2000

[54] PROPELLER HITCH COVER

[76] Inventor: Calvin S. Wang, 14317 E. Don Julian Rd., Industry, Calif. 91746

[21] Appl. No.: 09/338,369

[22] Filed: Jun. 23, 1999

[51] Int. Cl.[7] .................................................. B63H 1/14
[52] U.S. Cl. ............................................................ 440/49
[58] Field of Search .............................. 440/49, 900, 113; 280/507, 511, 33.992; 40/591, 590; 150/52

[56] References Cited

U.S. PATENT DOCUMENTS

| | | | |
|---|---|---|---|
| 5,273,399 | 12/1993 | Ojeda | 416/146 R |
| 5,489,111 | 2/1996 | Collins | 280/495 |
| 5,603,178 | 2/1997 | Morrison | 40/591 |
| 5,620,198 | 4/1997 | Borchers | 280/507 |
| 5,934,699 | 8/1999 | Blake | 280/507 |

OTHER PUBLICATIONS

Hartco, Prop–R Trailer Hitch Cover, West Marine Catalog, (p. 584), Jan. 1999.

*Primary Examiner*—S. Joseph Morano
*Assistant Examiner*—Patrick Craig Muldoon
*Attorney, Agent, or Firm*—Albert O. Cota

[57] ABSTRACT

A propeller hitch cover (10) which stimulates a ship's propeller and is designed to be removably attached to a vehicle's trailer hitch (90). When the propeller hitch cover (10) is attached, it is positioned in the path of an air flow produced by the vehicle's forward motion. When the air impinges on the propeller's blades (54) the blades (54) rotate.

5 Claims, 4 Drawing Sheets

PROPELLER HITCH COVER

TECHNICAL FIELD

The invention pertains to the general field of trailer hitch covers and more particularly a hitch cover having attached thereto a four-bladed propeller.

BACKGROUND ART

One of the most common of all available accessories for a vehicle is a trailer hitch. Depending on the vehicle's power, a trailer hitch can allow substantial loads, such as a boat, to be towed behind the vehicle. This allows a person to transport and store such items as a boat or work equipment to and from various locations with relative ease.

The only unfortunate aspect related to conventional, square tube trailer hitches is that they can detract from a vehicle's appearance although trailer hitches are fairly small, they do require an allotment of space under a vehicle's rear bumper and are visibility noticeable.

There have been efforts to hide trailer hitches, but most types of covers only manage to bring greater attention to the fact that there is a trailer hitch present. One novel alternative is to disguise the trailer hitch. This is accomplished by adding a cover that appears as a different object altogether. A popular cover utilizes a propeller, which when spinning from the rear of the vehicle, will give the impression of providing propulsion means.

DISCLOSURE OF THE INVENTION

The propeller hitch cover is designed to be used on vehicles equipped with a square tube on a trailer hitch. The hitch cover can be wind-powered or use an internal power supply, such as a battery or an external power supply, such as the vehicle's power or solar power. When functioning properly the hitch cover's propeller rotates in a manner similar to that of a ship. While primarily used as an aesthetic improvement for a vehicle, the propeller hitch cover may also provide safety features when reflective strips are attached onto the propellers.

In its most basic design, the propeller hitch cover is comprised of a hitch housing having a rear section, which includes a hitch cavity; a front surface having a first shaft bore; an upper horizontal side having a first retainer-pin bore; and a lower horizontal side having a second retainer-pin bore, which is in alignment with the first retainer-pin bore.

A propeller shaft retaining structure is frictionally inserted into the hitch cavity and attached therein by a retaining structure attachment means. The retaining structure also has a second shaft bore that is in alignment with the first shaft bore.

A propeller shaft having a front section and a rear section is rotatably inserted into the first shaft bore, and is rigidly attached by a shaft attachment means to the second shaft bore on the retaining structure.

Extending outward from a propeller hub is a propeller, which has at least four blades. The propeller hub is comprised of a flat front surface, a flat rear surface, and a propeller shaft bore extending therethrough the propeller shaft bore is dimensioned to allow the propeller hub to spin freely about the propeller shaft.

A propeller spinner has a substantially flat rear surface from where extends a propeller shaft cavity.

Inserted into and attached to the shaft cavity, by a spinner attachment means, is the front section of the propeller shaft.

In view of the above disclosure it is the primary object of the invention to provide an an aesthetically pleasing and novel addition to a vehicle, which when used properly can give the appearance that the vehicle is being propelled by the propeller on the hitch cover.

Another object of the invention is to provide an additional safety feature for the vehicle, when the propeller hitch cover is utilized with reflective strips attached to the propeller blades, thus providing additional visual indication of the vehicles presence.

In addition to the above objects of the invention it is also an object to produce a propeller hitch cover that:

is easy to install and use or can be used with any vehicle equipped with a square tube trailer hitch assembly, is relatively maintenance free, is cost effective from both a manufacturer's and consumer's point of view, and is easily removed for use on more than one vehicle.

These and other objects and advantages of the present invention will become apparent from the subsequent detailed description of the preferred embodiment and the appended claims taken in conjunction with the accompanying drawings.

BEST DESCRIPTION OF THE DRAWINGS

BEST MODE FOR CARRYING OUT THE INVENTION

Figure 1:
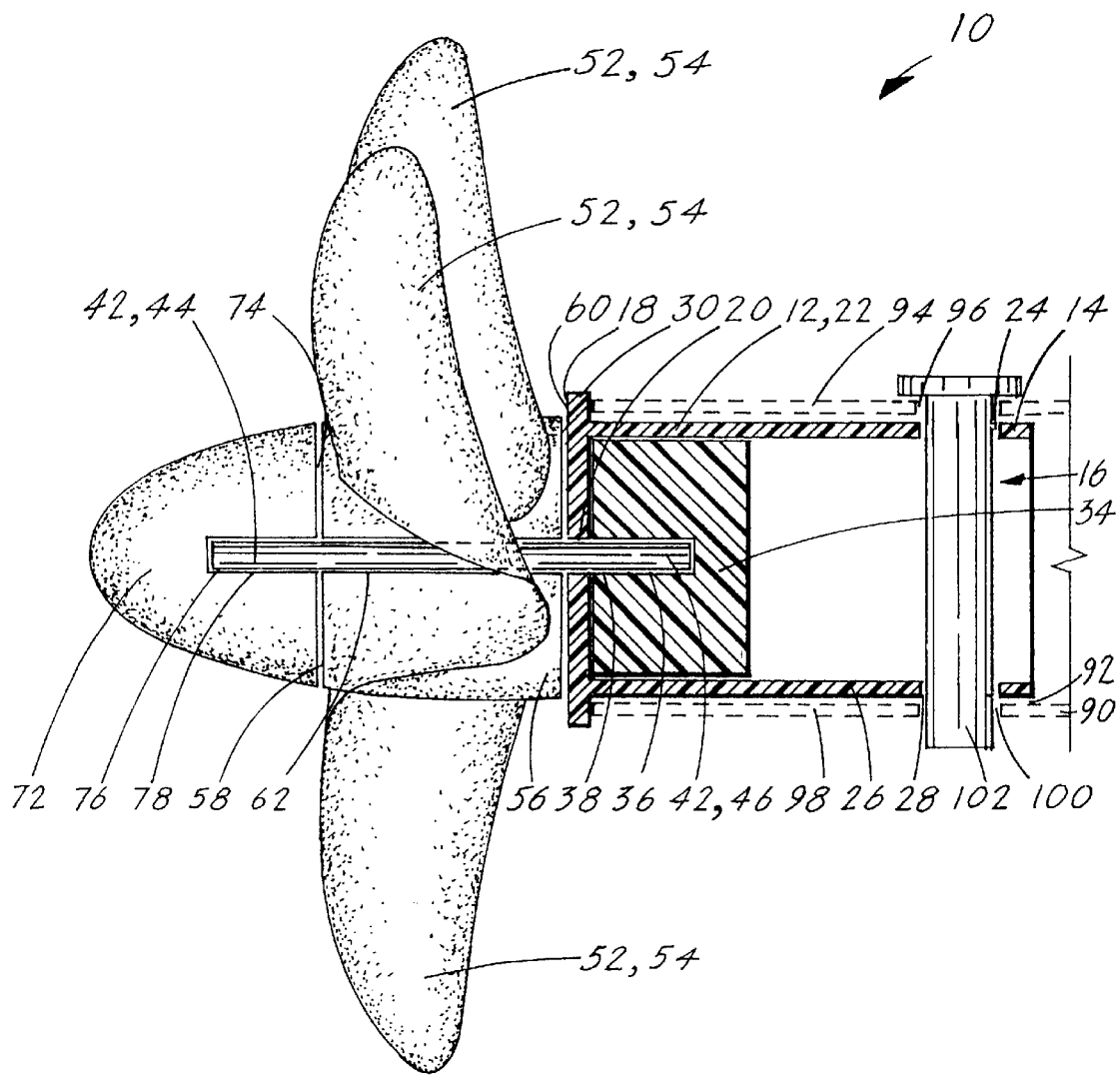
FIG. 1 is a side elevational sectional view of the propeller hitch cover.

The best mode for carrying out the invention is presented in terms of a preferred embodiment for a vehicle hitch cover designed as a propeller. The hitch cover's design allows it to be releasably attached to a vehicle's trailer hitch, which is typically located in the middle of a rear member of the vehicle. When functioning properly, the hitch cover's propeller, by means of wind power or a power device such as a battery or the vehicle's alternator/battery, spins in a circular motion, thus giving the appearance of a ship's propulsion system. The propeller hitch cover 10, hereinafter "hitch cover 10", as shown in FIGS. 1–10, is comprised of the following major elements: a hitch housing 12, a propeller-shaft retaining structure 34, a propeller shaft 42, a propeller 52, and a propeller spinner 72.

Figure 2:
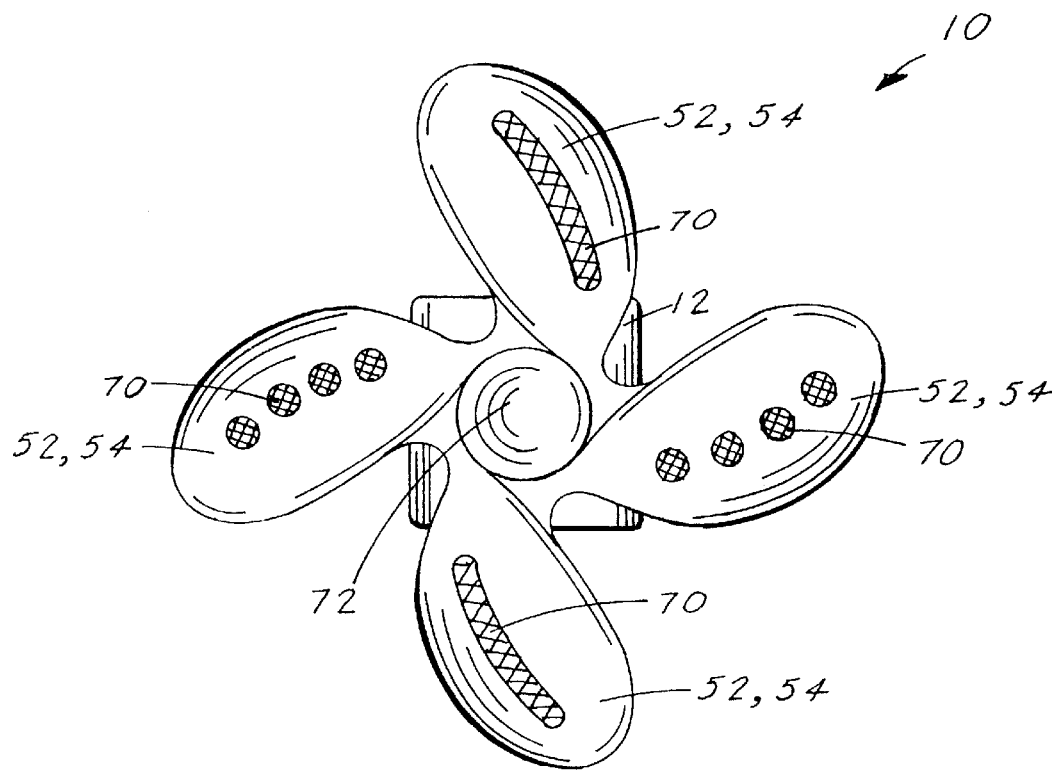
FIG. 2 is a front elevational view of the propeller hitch cover with propeller blades that includes a reflective strip.
Figure 3:
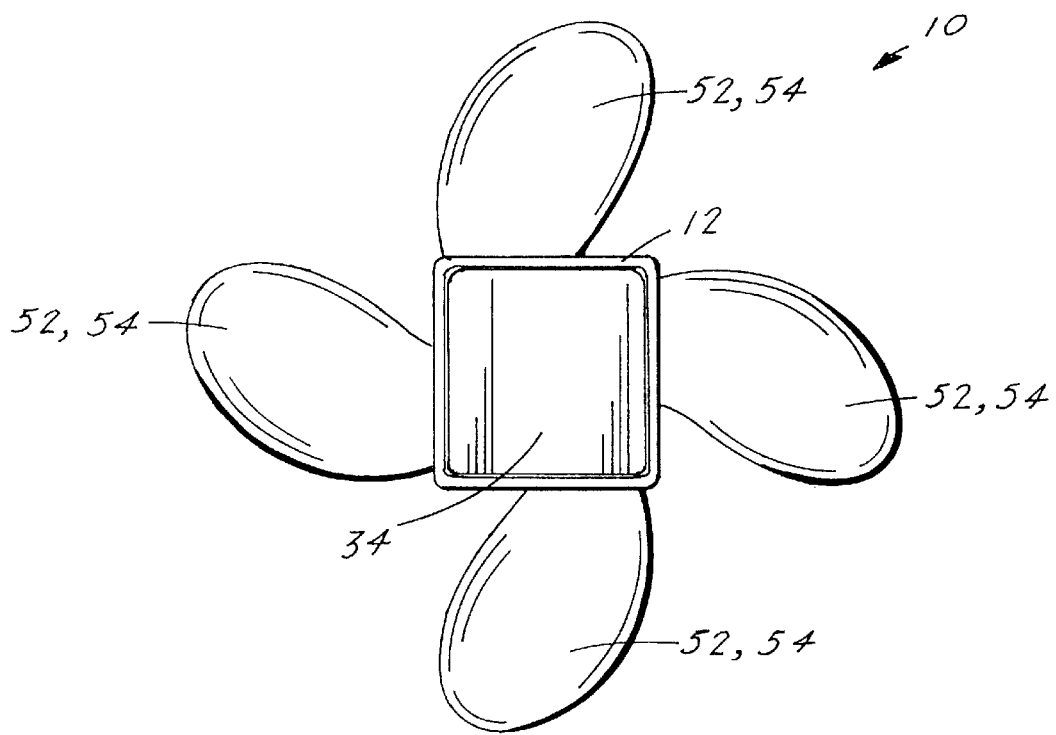
FIG. 3 is a rear elevational view of the propeller hitch cover.
Figure 4:
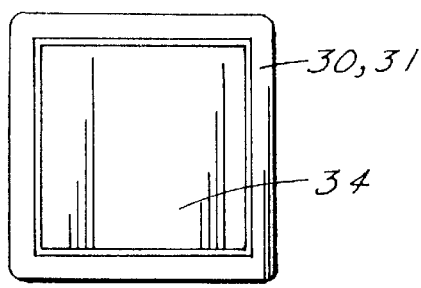
FIG. 4 is a side elevational view of a square shaped hitch housing flange.
Figure 5:
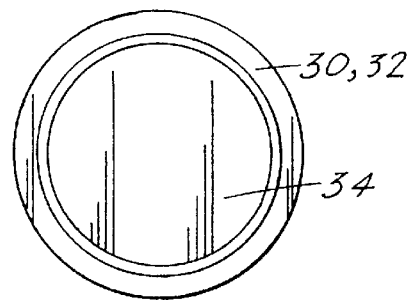
FIG. 5 is a side elevational view of a circular shaped hitch housing flange.

In order to attach the hitch cover 10 onto a vehicle's trailer hitch 90 several elements are utilized. The first element is the hitch housing 12, which is shown in FIGS. 1–3. The hitch housing 12 is comprised of a rear section 14 having a hitch cavity 16, a front surface 18 having a first shaft bore 20, an upper horizontal side 22 having a first retainer-pin bore 24, and a lower horizontal side 26 having a second retainer-pin bore 28, which is in alignment with the first retainer-pin bore 24. Additionally, the front surface 18 of the hitch housing 12 further comprises a flange 30. The flange 30, which can be in either a square shape 31, as shown in FIG. 4, or a circular shape 32, as shown in FIG. 5, extends along the sides of the front surface 18, as shown in FIG. 1. Preferably, both the rear section 14 of the hitch housing 12, and the flange 30 are integrally molded of a hard plastic.

The second element is the propeller shaft retaining structure 34, as also shown in FIG. 1. The retaining structure 34 is frictionally inserted into the hitch cavity 16 on the rear section 14 of the hitch housing 12, and is attached therein by a shaft attachment means 36. The retaining structure 34 also has a second shaft bore 38 that is in alignment with the first shaft bore 20, which is located on the front surface 18 of the hitch housing 12.

Figure 6:
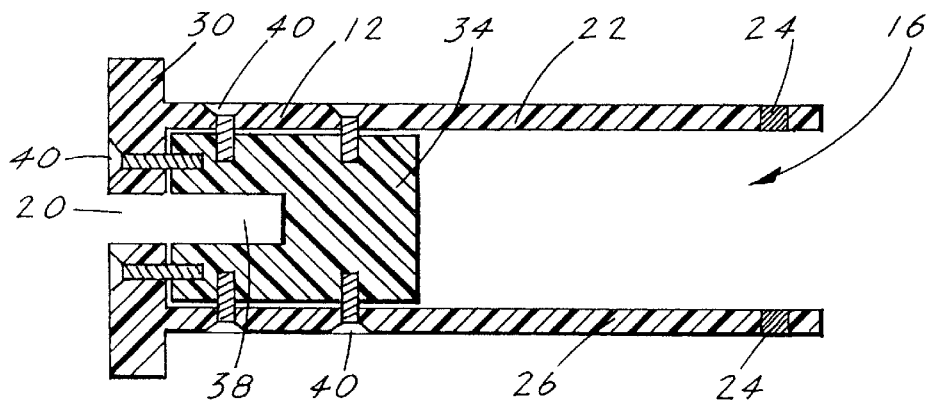
FIG. 6 is a cross-sectional side view of the hitch housing showing the propeller shaft retaining structure attached by means of screws.
Figure 7:
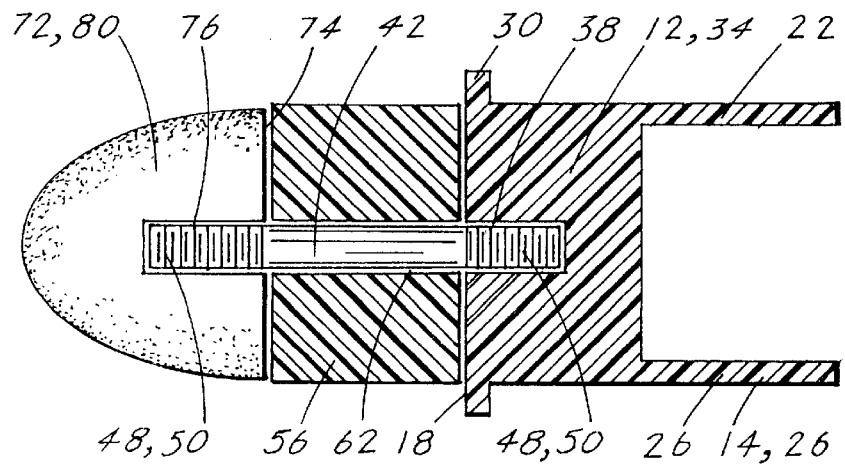
FIG. 7 is a cross-sectional side view showing the propeller shaft attached to the respective shaft bores by means of threaded sections.

As shown in FIG. 6, means for attaching the propeller shaft retaining structure 34 to the hitch housing cavity 16 can comprise either a plurality of screws 40 that are inserted through the walls of the cavity 16 into the structure 34, or the plurality of screws 40 are driven into the flange 30 and then into the structure 34 as also shown in FIG. 6. Alternatively, as shown in FIG. 7, the retaining structure 34 is integrally molded with the hitch housing 12.

Figure 10:
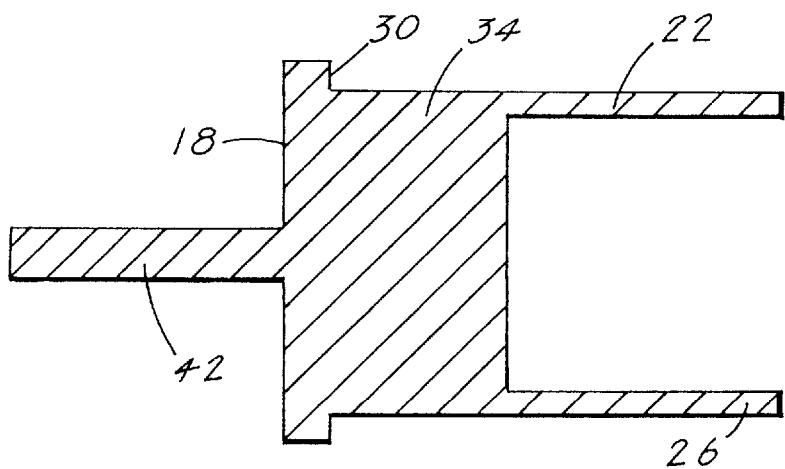
FIG. 10 is a cross-sectional side view of a hitch housing, a propeller shaft retaining structure and a propeller shaft are integrally molded.

The third element utilized is the propeller shaft 42, which is shown in FIG. 1, and has a front section 44 and a rear section 46. The rear section 46 is rotatably inserted into the first shaft bore 20, and is rigidly attached by a shaft attachment means 48 to the second shaft bore 38 on the retaining structure 34. The attachment means 48 for attaching the propeller shaft 42 within the second shaft bore 38 comprises the rear section 46 of the propeller shaft 42 having a set of threads 50, as shown in FIG. 7. The second shaft bore 38 on the retaining structure 34 has a corresponding set of threads 50, into which is threaded the propeller shaft 42. Additionally, as shown in FIG. 10, the propeller shaft 42 can be integrally molded with the propeller shaft retaining structure 34.

Figure 9:
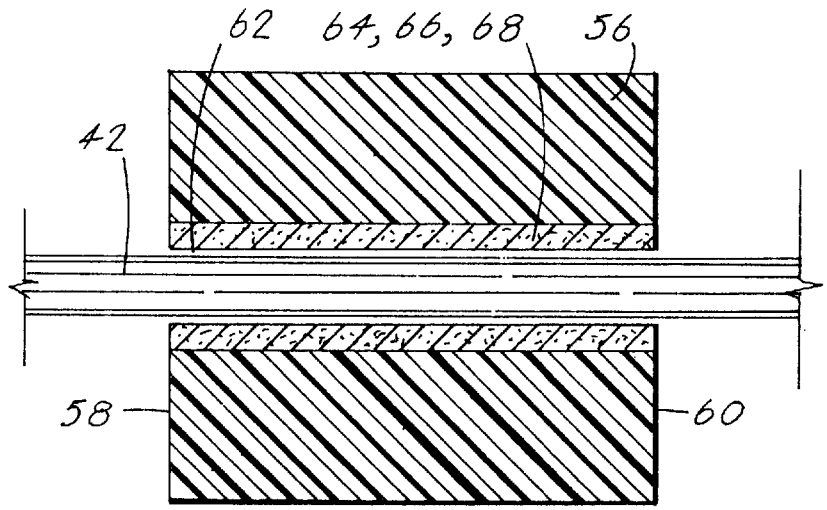
FIG. 9 is a cross-sectional side view showing a propeller shaft bushing made of a TEFLON™ or an oil-impregnated sintered bronze bushing.

The propeller 52, which is shown in FIGS. 1–3, has at least four blades 54 extending outward from a propeller hub 56. As shown in FIG. 2, each propeller blade 54 may have a reflective strip 70 attached. The reflective strip 70 can substantially increase the hitch cover's ability to be utilized as a safety device, in addition to its aesthetic purpose. The hub 56, as shown in FIG. 7, has a flat front surface 58, a flat rear surface 60 and a propeller shaft bore 62 extending therethrough. The propeller shaft bore 62 is dimensioned to allow the propeller hub 56 to spin freely about the propeller shaft 42. The propeller hub 56 further comprises a bushing 64, which is dimensioned to rotatably accept the propeller shaft 42 as shown in FIG. 7. The bushing 64 is comprised of either Teflon™ 66 or an oil-imprgnated sintered bronze bushing 68, both of which are shown in FIG. 9.

Figure 8:
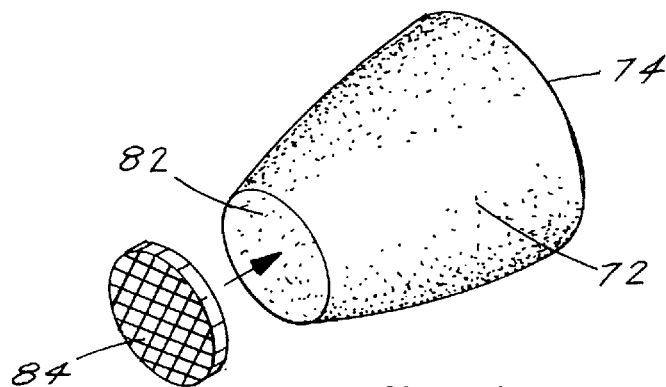
FIG. 8 is a perspective view of a truncated spinner to which is attached a reflector.

The propeller spinner 72 is shown in FIG. 1 and has a substantially flat rear surface 74 from where extends a propeller shaft cavity 76. The front section 44 of the propeller shaft 42 is inserted and attached into the propeller shaft cavity 76 by a spinner attachment means 78. The propeller spinner 72 has a substantially parabolic shape 80, as shown in FIGS. 1 and 7, and, as shown in FIG. 8, the tip 82 of the parabolic spinner is truncated, in order to create a surface to which may be attached a reflector 84. Additionally, as also shown in FIG. 1, the propeller spinner 72 is frictionally attached to the integral propeller shaft 42.

There are two means by which the front section 44 of the propeller shaft 42 may be attached to the propeller shaft cavity 76 on the propeller spinner 72. The first attachment means is shown in FIG. 7, and is comprised of the front section 44 of the propeller shaft 42 having a set of threads 50. The rear surface 74 of the propeller spinner 72 has a shaft cavity 76 which includes a corresponding set of threads 50, into which is threaded the front section 44 of the propeller shaft 42.

The second attachment means is shown in FIG. 1 and comprises the rear surface 74 of the propeller spinner 72 having a propeller shaft cavity 76 into which is frictionally inserted the front section 44 of the propeller shaft 42.

In order to releasably attach the hitch cover 10 to the vehicle trailer hitch 90, as shown in FIG. 1, the hitch housing 12 is inserted into a cavity 92 that is located in the trailer hitch 90. The cavity 92 includes an upper horizontal side 94 which has an upper retainer-pin bore 96, and a lower horizontal side 98 which has a lower retainer-pin bore 100. To secure the hitch cover 10, a retaining pin 102 is inserted sequentially through the upper retainer-pin bore 96, the first retainer-pin bore 24, the second retainer-pin bore 28, and the lower retainer-pin bore 100.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

What is claimed is:

1. A propeller hitch cover designed to be releasably attached to a vehicle trailer hitch attached to a rear member on a vehicle, said hitch cover comprising:
 a) a hitch housing comprising:
  (1) a rear section having a hitch cavity,
  (2) an integrally molded front surface comprising a flange having a first shaft bore
  (3) an upper horizontal side having a first retainer-pin bore and
  (4) a lower horizontal side having a second retainer-pin bore in alignment with the first retainer-pin bore,
 b) a propeller shaft retaining structure frictionally inserted into said hitch cavity and attached therein by a retaining structure attachment means, wherein said retaining structure having a second shaft bore in alignment with said first shaft bore,
 c) a propeller shaft having a front section, a rear section, and a relatively small diameter with respect to said propeller shaft retaining structure, wherein the rear section is rotatably inserted into the first shaft bore, and is rigidly attached by a shaft attachment means to the second shaft bore on said retaining structure,
 d) a propeller having at least four blades extending outward from a propeller hub, wherein said hub having a flat front surface, a flat rear surface, and a propeller shaft bore extending therethrough, wherein the propeller shaft bore is dimensioned to allow the propeller hub to spin freely about the propeller shaft, and e) propeller spinner having a substantially parabolic shape and a flat rear surface from where extends a propeller shaft cavity into which is inserted and attached, by a spinner attachment means, the front section of said propeller shaft, wherein said hitch cover is releasably attached to the vehicle trailer hitch by inserting said hitch housing into a cavity located in the trailer hitch which includes an upper horizontal side having an upper retainer-pin bore and a lower horizontal side having a lower retainer-pin bore, wherein to secure said hitch cover a retaining pin is inserted sequentially through the upper retainer-pin bore, the first retainer-pin bore, the second retainer-pin bore, and the lower retainer-pin bore.

2. The propeller hitch cover as specified in claim 1 wherein said means for attaching said propeller shaft within the second shaft bore on said retaining structure comprises:

a) said rear section of said propeller shaft having a set of threads, and b) the second shaft bore on said retaining structure having a corresponding set of threads into which is threaded said propeller shaft.

3. The propeller hitch cover as specified in claim 1 wherein said propeller hub further comprises a bushing dimensioned to rotatably accept said propeller shaft.

4. The propeller hitch cover as specified in claim 1 wherein said means for attaching the front section of said propeller shaft to the propeller shaft cavity on said propeller spinner comprises:

a) said front section of said propeller shaft having a set of threads, and b) the rear surface of said propeller spinner having the shaft cavity which includes a corresponding set of threads located into which is threaded the front section of said propeller shaft.

5. The propeller hitch cover as specified in claim 1 wherein said means for attaching the front section of said propeller shaft to the propeller shaft cavity on said spinner comprises the rear surface of said propeller spinner having the propeller shaft cavity into which is frictionally inserted the front section of said propeller shaft.

* * * * *